US009476691B2

(12) United States Patent
May

(10) Patent No.: US 9,476,691 B2
(45) Date of Patent: Oct. 25, 2016

(54) MAGNETIC BASED CONTACTLESS MEASURING SENSOR

(75) Inventor: Lutz May, Berg (DE)

(73) Assignee: POLYRESEARCH AG, Chur (CH)

( * ) Notice: Subject to any disclaimer, the term of this patent is extended or adjusted under 35 U.S.C. 154(b) by 95 days.

(21) Appl. No.: 14/116,422

(22) PCT Filed: May 4, 2012

(86) PCT No.: PCT/EP2012/058300
§ 371 (c)(1),
(2), (4) Date: Sep. 24, 2014

(87) PCT Pub. No.: WO2012/152720
PCT Pub. Date: Nov. 15, 2012

(65) Prior Publication Data
US 2015/0028859 A1    Jan. 29, 2015

(30) Foreign Application Priority Data

May 11, 2011  (EP) ..................... 11165688
Dec. 22, 2011  (EP) ..................... 11195273

(51) Int. Cl.
*G01B 7/30*  (2006.01)
*G01B 7/14*  (2006.01)
(Continued)

(52) U.S. Cl.
CPC ............... *G01B 7/14* (2013.01); *G01D 5/145* (2013.01); *G01L 3/00* (2013.01); *G01L 3/105* (2013.01); *G01P 3/42* (2013.01); *G01P 3/488* (2013.01)

(58) Field of Classification Search
CPC .......... G01B 7/14; G01D 5/145; G01L 3/00; G01L 3/105; G01L 1/12; G01L 1/127; G01P 3/42; G01P 3/488

USPC ................ 324/207.15–207.26, 174, 225
See application file for complete search history.

(56) References Cited

U.S. PATENT DOCUMENTS 2,564,221 A * 8/1951 Hornfeck ............ G01D 5/2258
                                                       177/210 R
3,205,485 A * 9/1965 Noltingk ................ B23Q 15/00
                                                            323/347
(Continued)

FOREIGN PATENT DOCUMENTS

DE    WO 0196826 A2 * 12/2001 ............ G01L 3/101
DE    10 2008 001 006    11/2009
(Continued)

*Primary Examiner* — Jay Patidar
(74) *Attorney, Agent, or Firm* — Fay Kaplun & Marcin, LLP

(57) ABSTRACT

Contactless measurement sensor for measuring at least one of a distance to an object to be sensed, a motion with respect to an object to be sensed, a speed with respect to an object to be sensed, a torque applied to an object to be sensed and a force applied to an object to be sensed the contactless measurement sensor comprises a first magnetic field generating unit being adapted for generating a magnetic field towards the object to be sensed, a first magnetic field detector unit being adapted for detecting a first magnetic field which field being generated by the first field generator unit and being influenced by a respective distance, motion, speed, applied torque and applied force to be measured, wherein the first magnetic field detector unit is further adapted for outputting a first signal being representative for the detected magnetic field, and an evaluating unit being adapted for evaluating a signal strength of the first signal and determining the respective distance, motion, speed, applied torque and applied force based on the first signal.

15 Claims, 11 Drawing Sheets

(51) Int. Cl.
   *G01D 5/14*      (2006.01)
   *G01P 3/488*     (2006.01)
   *G01L 3/10*      (2006.01)
   *G01L 3/00*      (2006.01)
   *G01P 3/42*      (2006.01)

(56) References Cited

U.S. PATENT DOCUMENTS

| | | | | |
|---|---|---|---|---|
| 3,810,136 A * | 5/1974 | Lang | ................... | G01D 5/2013 324/207.17 |
| 4,523,482 A * | 6/1985 | Barkhoudarian | ....... | G01L 3/102 324/209 |
| 4,572,005 A * | 2/1986 | Kita | ........................ | G01L 3/105 324/209 |
| 4,752,739 A * | 6/1988 | Wang | ..................... | G01B 7/105 324/207.17 |
| 4,803,885 A * | 2/1989 | Nonomura | .............. | G01L 3/102 73/862.333 |
| 4,811,609 A * | 3/1989 | Nishibe | ................... | G01L 3/105 73/862.333 |
| 5,059,902 A * | 10/1991 | Linder | ................... | G01B 7/023 324/204 |
| 6,472,863 B1 * | 10/2002 | Garcia | ................. | G01D 5/2013 324/166 |
| 6,581,480 B1 * | 6/2003 | May | ........................ | G01L 3/102 73/862.333 |
| 6,650,113 B2 * | 11/2003 | Sekiya | ................. | G01R 33/028 324/207.17 |
| 7,999,535 B2 * | 8/2011 | Dietz | .................... | G01D 5/2046 324/207.17 |
| 2002/0017902 A1 * | 2/2002 | Vasiloiu | ............... | G01D 5/2046 324/207.17 |
| 2004/0040391 A1 * | 3/2004 | May | ........................ | G01D 5/14 73/862.331 |
| 2005/0061088 A1 * | 3/2005 | May | ........................ | G01L 3/109 73/862.331 |
| 2005/0225320 A1 * | 10/2005 | Lee | ....................... | G01D 5/2053 324/207.17 |
| 2014/0035564 A1 * | 2/2014 | Lee | .......................... | G01B 7/14 324/207.12 |

FOREIGN PATENT DOCUMENTS

| | | |
|---|---|---|
| WO | 01/79801 | 10/2001 |
| WO | 02/23146 | 3/2002 |
| WO | 2009/121355 | 10/2009 |

* cited by examiner

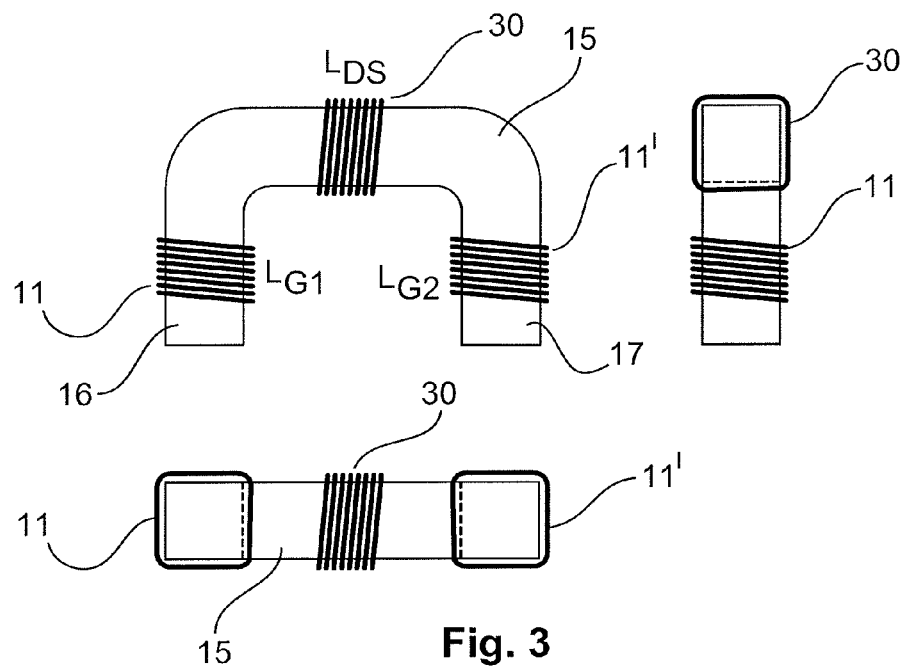
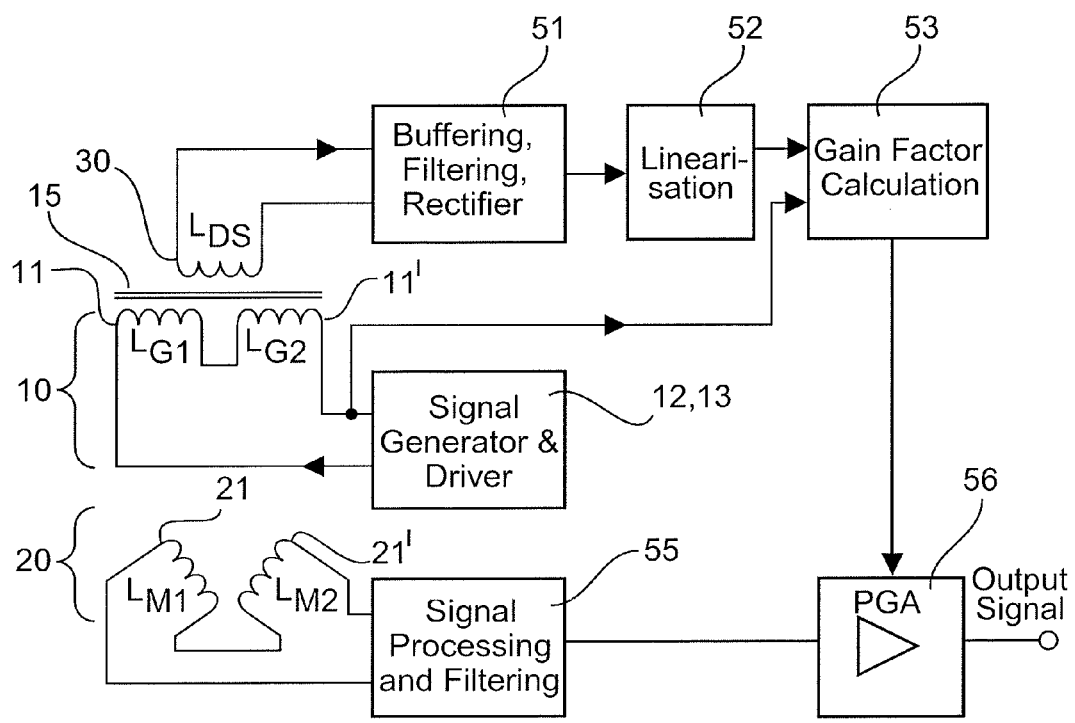
Fig. 3
Fig. 4

α = const.

Side View

MAGNETIC BASED CONTACTLESS MEASURING SENSOR

BACKGROUND OF THE INVENTION

The present invention relates to a magnetic based contactless measuring sensor and a magnetic based contactless measuring method allowing contactless measuring without the need of pre-processing the sensing object.

FIELD OF THE INVENTION

Distance, motion, torque and force measuring is important for many industrial applications, in particular for arrangements being dynamically impacted by a distance, motion, torque and force. Applied forces may be pressuring forces as well as moments like torque and bending impact. An exemplary application is a shaft for a vehicle being arranged between a motor and e.g. a wheel. For determining a torque in the shaft, either a particular element needs to be mounted to the shaft, or the shaft needs to be pre-processed, e.g. magnetized. Mounting elements to a shaft may influence the movement of the shaft, pre-processing may be difficult when the shaft is not accessible or cannot me dismounted for pre-processing.

SUMMARY OF THE INVENTION

It would be desireable to provide an improved device and method for contactless distance, motion, torque and force measuring.

The invention provides a method and device for contactless measuring distance, motion, torque and/or force measuring, a corresponding program element and computer readable medium, according to the subject matter of the independent claims. Further embodiments are incorporated in the dependent claims.

It should be noted that the following described exemplary embodiments of the invention apply also for the method, the device, the program element and the computer readable medium.

According to an exemplary embodiment of the invention, there is provided a contactless measurement sensor for measuring at least one of a distance to an object to be sensed, a motion with respect to an object to be sensed, a speed with respect to an object to be sensed, a torque applied to an object to be sensed and a force applied to an object to be sensed the contactless measurement sensor comprises a first magnetic field generating unit being adapted for generating a magnetic field towards the object to be sensed, a first magnetic field detector unit being adapted for detecting a first magnetic field which field being generated by the first field generator unit and being influenced by a respective distance, motion, speed, applied torque and applied force to be measured, wherein the first magnetic field detector unit is further adapted for outputting a first signal being representative for the detected magnetic field, and an evaluating unit being adapted for evaluating a signal strength of the first signal and determining the respective distance, motion, speed, applied torque and applied force based on the first signal.

Thus, it is possible to measure without any contact a distance, motion, torque and/or force applied to an object to be measured. The magnetic field generating unit may comprise a permanent magnet combined with a alternating magnet, like a coil. The magnetic field sensing unit may comprise a coil arrangement, a hall sensor or the like. The coil arrangement may comprise a plurality of coils having different special directions. The coils may be arranged in a V-form, e.g. a rectangular V-form.

According to an exemplary embodiment of the invention the contactless measurement sensor further comprises a second magnetic field generating unit being adapted for generating a magnetic field towards the object to be sensed, a second magnetic field detector unit being adapted for detecting a magnetic field which field being generated by the second field generator unit and being influenced by an applied force to be measured, wherein the second magnetic field detector unit is further adapted for outputting a second signal being representative for the detected magnetic field, wherein the evaluating unit being adapted for evaluating a signal strength of the first signal and the second signal and determining the applied force based on the first signal and the second signal.

Thus, it is possible to evaluate the difference between the respective first and second elements, in particular the signals generated by the respective first and second elements. The difference may be used to eliminate disturbing effects. The disturbing effects may vary. E.g. when measuring a force or torque, the varying distance of the sensor may be the disturbing effect. When measuring a distance, outer field influences may be the disturbing effects.

According to an exemplary embodiment of the invention at least one of the first and second magnetic field generating units comprises a magnetic field generating element and a flux concentrator, wherein the flux concentrator cooperates with the magnetic field generating element so as to concentrate the generated magnetic field towards the object to be sensed.

Thus, the magnetic field may be concentrated. Further the geometry and the distance may be considered more exactly. The flux concentrator may have different shapes. The poles of the flux concentrators may be adapted to the surface of the object to be sensed. The surface of the poles facing the object to be sensed may have corresponding shapes. For a rotating object, the faces of the poles may have a tubular concave shape. The flux concentrator may be adapted in shape to the available space.

According to an exemplary embodiment of the invention the flux concentrator is of a U-shape, in particular of a horseshoe shape and having two poles, wherein both poles are oriented towards the object to be sensed.

Thus, the magnetic field may be concentrated onto the object to be sensed.

According to an exemplary embodiment of the invention at least one of the first and second magnetic field detecting units comprises a coil, which coil is located between the both poles.

Thus, the sensing coil or sensing coils may have good signal quality.

According to an exemplary embodiment of the invention the coil is oriented into a direction corresponding to a connection line between the both poles.

According to an exemplary embodiment of the invention the coil is oriented traverse to a direction corresponding to a connection line between the both poles.

According to an exemplary embodiment of the invention the coil is offset to a connection line between the both poles.

According to an exemplary embodiment of the invention the contactless measurement sensor further comprises at least one feedback element being connected to the evaluation unit and being adapted to provide a comparative signal, based on which the evaluation unit compensates a varying distance between the contactless measurement sensor and an object to be measured.

Thus, it is possible to eliminate disturbing effects. When measuring a force, the feedback element may serve for eliminating a varying distance between the sensor and the object to be measured.

According to an exemplary embodiment of the invention the feedback element is a coil wound around the flux concentrator.

Thus, the feedback element may use the same concentrator path as the generating element, e.g. a coil. Further such an arrangement is less space consuming.

According to an exemplary embodiment of the invention the evaluation unit is adapted for determining a distance between the magnetic field generating unit and the object to be sensed based on a signal of the feedback element.

Thus, it is possible to detect a distance without the need of significant modification of the sensor.

According to an exemplary embodiment of the invention at least one of the first and second magnetic field generating units is adapted for generating a magnetic field being a combination of a permanent magnetic field and a magnetic field having an alternating frequency.

According to an exemplary embodiment of the invention at least one of the first and second magnetic field generating units is adapted for adopting a frequency of the generated magnetic field.

Thus, the sensor arrangement may be adapted to different measurement ranges and materials. It should be noted that the frequency may automatically adapted.

According to an exemplary embodiment of the invention the first magnetic field generating unit and the second magnetic field generating unit are arranged at opposite sides of an object to be sensed so as to be oriented toward each other, having a space between the first magnetic field generation unit and the first magnetic field sensing unit on the one hand and the second magnetic field generation unit and the second magnetic field sensing unit on the other hand for receiving an object with respect to which a respective distance, motion, speed, applied torque and applied force is to be measured.

Thus, it is possible to eliminate bending forces when detecting e.g. torque.

According to an exemplary embodiment of the invention the space is adapted so as to receive an elongated object.

According to an exemplary embodiment of the invention the contactless measurement sensor is adapted measuring bending forces, wherein the evaluation unit is adapted for evaluating the first and second signal of the magnetic field detector unit and to determine a bending force based on the first and second signal.

According to an exemplary embodiment of the invention the magnetic field generating unit comprises a coil wound around a flux concentrator, wherein the coil also serves as feedback element, wherein the contactless measurement sensor further comprises a shunt resistor, wherein the shunt resistor is parallel to the combined generator and feedback coil, wherein the signal for evaluating is the voltage drop over the shunt resistor.

Thus it is possible to provide a sensor arrangement with less elements resulting in less errors and less costs, faster manufacturing etc.

According to an exemplary embodiment of the invention there is provided a sensing arrangement having a contactless measurement sensor as described above and an elongated object, wherein a longitudinal extension of the magnetic field generation unit is substantially parallel with a longitudinal extension of the elongated object.

According to an exemplary embodiment of the invention there is provided a sensing arrangement having a contactless measurement sensor as described above and an elongated object, wherein a longitudinal extension of the magnetic field generation unit is substantially traverse to a longitudinal extension of the elongated object.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

It has to be noted that exemplary embodiments of the invention are described with reference to different subject matters. In particular, some exemplary embodiments are described with reference to apparatus type claims whereas other exemplary embodiments are described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered to be disclosed with this application.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage.

A computer program may be stored and/or distributed on a suitable medium, such as an optical storage medium or a solid state medium supplied together with or as part of other hardware, but may also be distributed in other forms, such as via the internet or other wired or wireless telecommunication systems.

BRIEF DESCRIPTION OF THE DRAWINGS

FIG. 3 illustrates a sensor arrangement with a compensation coil according to an exemplary embodiment.

FIG. 4 illustrates a driving and control circuit for a sensor arrangement with a compensation coil according to an exemplary embodiment.

DETAILED DESCRIPTION OF EXEMPLARY EMBODIMENTS

Magnetic field based sensors are sensitive to a number of mechanical design parameters, like a spacing (air-gap) between the sensor and the test object to be sensed, an inclination or tilting of the sensor unit in relation to the test object to be sensed, an angular alignment between an field generator device and a magnetic field sensor device of the sensor.

The aspect of the gap or spacing may be used for an automatic distance control. In the following, the mechanical and electronic design options available for an effective automatic distance compensation system will be described.

Figure 1:
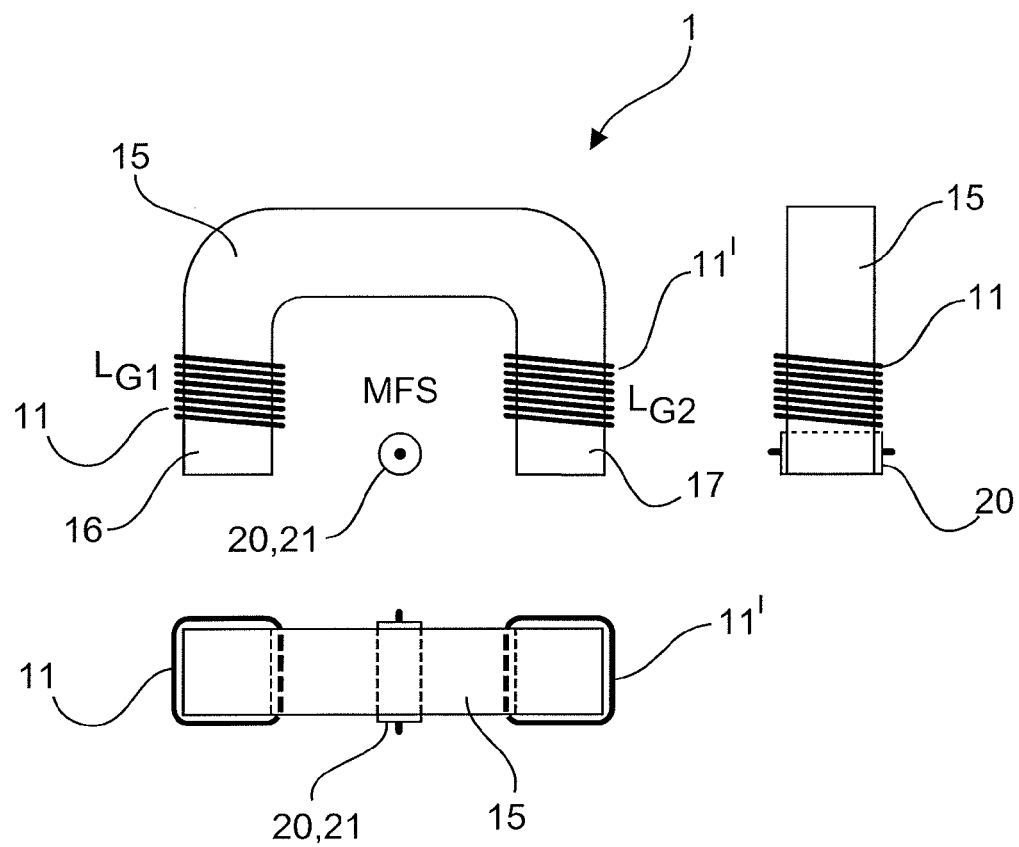
FIG. 1 illustrates a sensor arrangement according to an exemplary embodiment.

In FIG. 1 there is shown the basic mechanical sensor module design as used for a so called Heidi-ICE torque sensor. A similar (but not mandatorily identical) design may be used for a motion and speed sensor, which sensor comprises a flux concentrator 15, generator coils 11, and a magnetic field sensing unit 10, e.g. in form of magnetic field sensing coils 21. It should be noted that also other magnetic field detecting elements may be used like for example hall sensors etc. The magnetic field sensing coil 21 (MFS) is placed in such way that there will be a signal to measure in relation to the physical parameter that has to be monitored and to eliminate the risk that the MFS coil 21 will be accidentally saturated by the magnetic field generator signal. In relation to the Heidi-ICE sensor, for particular applications, an optimal placement of the MFS coil 21 may be 90 degree in relation to the generator field. FIG. 1 illustrates a sensor arrangement 1 having two generator coils 11, 11', wound around a respective leg of the flux concentrator 15, having two poles 16 and 17. FIG. 1 illustrates a basic design of the so called Heidi-ICE sensor element hardware.

Figure 2:
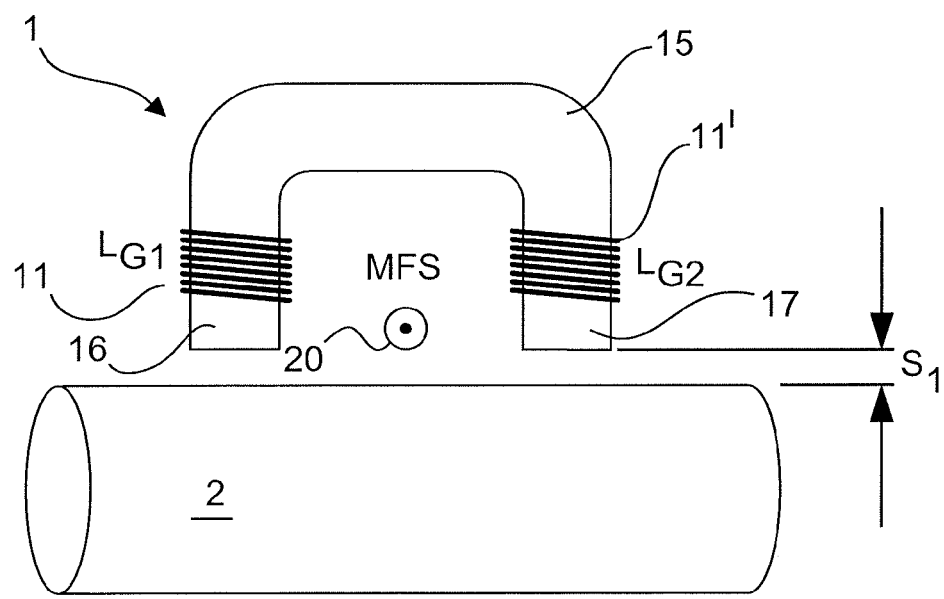
FIG. 2 illustrates a sensor arrangement with an object to be sensed according to an exemplary embodiment.

FIG. 2 illustrates the sensor arrangement 1 in combination with an object to be sensed 2. For particular applications, the largest signal can be expected or retrieved when the flux concentrator 15 is touching the test object 2. The further away the flux concentrator 15 is in relation to the test object surface, the smaller the sensor signal will be. The signal gain loss in relation to the spacing S1 (air-gap) between the test object and the sensor device is almost strictly linear and proportional to the dimension of the air-gap S1. When using a flux concentrator 15 of the size of a Euro coin, then the maximum spacing possible is around 6 mm before the measured signal gain is "zero".

Using the principle of a lose transformer coupling, allows to get reliable feedback in relation when changing the air-gap, which is the distance between the sensor and the test object. This will be described with respect to FIG. 3. The additional measurement coil 30 $L_{DS}$ will be placed around the flux concentrator 30 and is optimized for the field generator driver frequency. The signal strength received at LDS 30 is an exponential like function in relation to the air gap. The remaining elements correspond to those of FIGS.

1 and 2. In FIG. 3 a third coil 30, called $L_{DS}$, is added in the centre of the flux concentrator 15. The signal generated by the Distance Measurement Coil (LDS) can be used the correct the signal amplification of the torque sensor electronics 50, which may include a buffering, filtering and rectifying 51, a linearization 52 and gain factor calculation 53, as can be seen from FIG. 4. The remaining elements correspond to those described above. FIG. 4 illustrates a block diagram according to one of several options about how the signal, generated by the coil $L_{DS}$ 30 needs to be processed further to correct the amplification settings of the torque sensor signal buffer 56 (here called PGA for Programmable Gain Amplifier). The generator coils 11, 11' are driven by a signal generator 12 and driver 13. In addition it shows also a new approach about how to detect the magnetic signals with the Magnetic Field Sensing coils 21, 21' (LM1 and LM2). These two coils 21, 21' may be arranged in a "V" shape and are connected with each other in series, in a reverse mode (differential measurement). Te coils 21, 21' are connected to a signal processing and filtering unit 55.

Figure 5:
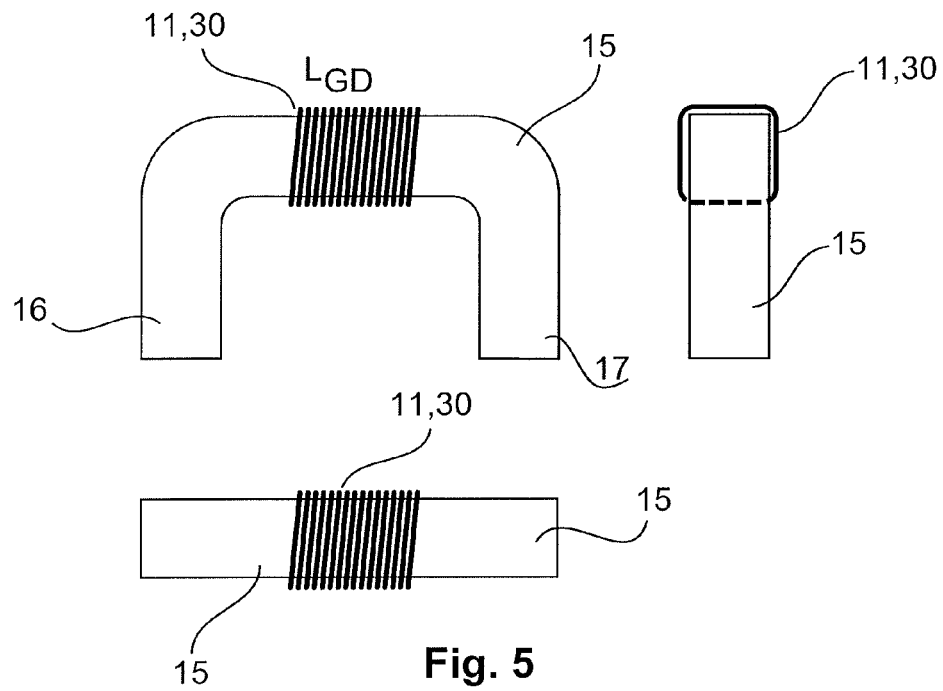
FIG. 5 illustrates a sensor arrangement with a combined compensation coil according to an exemplary embodiment.
Figure 6:
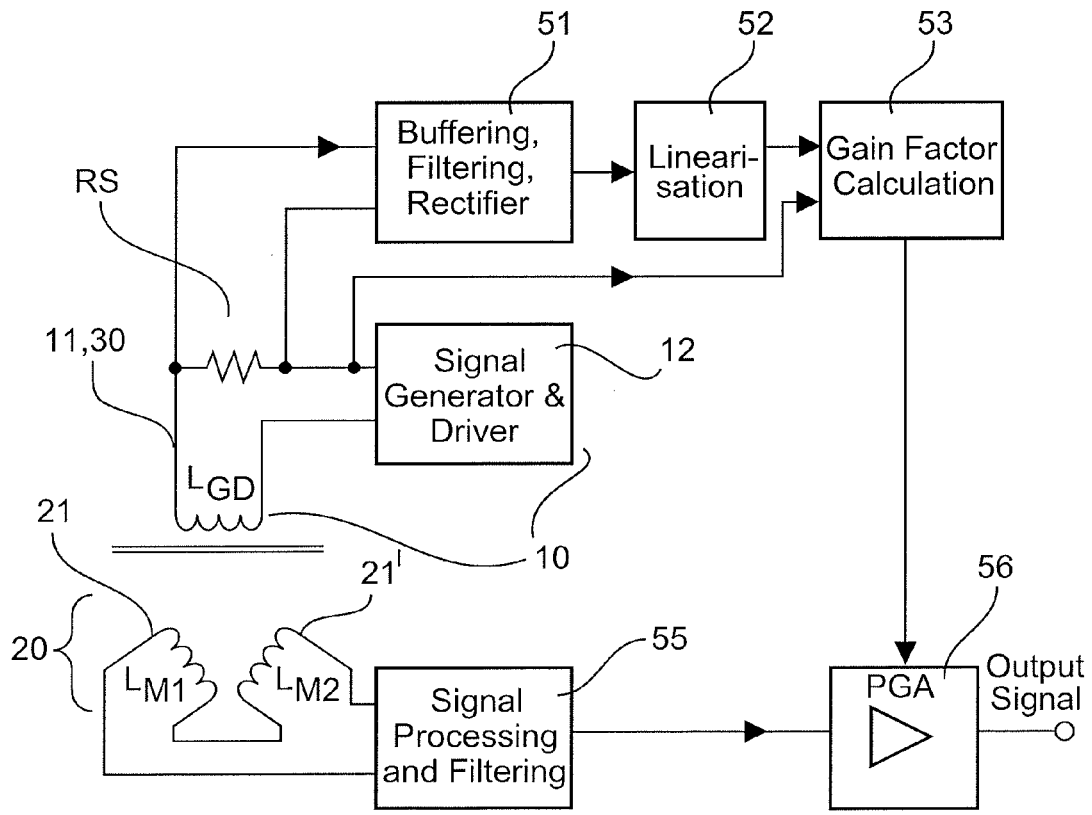
FIG. 6 illustrates a driving and control circuit for a sensor arrangement with a combined compensation coil according to an exemplary embodiment.

As an alternative, in particular for reducing the costs, it is possible to provide an alternative build up of the sensor arrangement 1. The simplification is realized by sing a single coil for the generation and sensing. In other words, the generator coil 11 and the distance sensing coil 30 are combined to be realized in a single coil, as can be seen from FIG. 5. Thus, for simplifying the mechanical design of the sensor unit 1, only one coil 11, 30 is required ($L_{GD}$) for both, measuring and sensing. FIG. 5: illustrates the greatly simplified design. Now only one coil is required (LGD) 11, 30 where before three coils 11, 11' and 30 were used. This one coil (LGD) is placed in the symmetrical centre of the flux concentrator 15 and acts as both: the magnetic field generator, and as the distance sensing device. FIG. 6 illustrates a circuit for evaluating such a coil design. The voltage drop at the sense resistor $R_S$ will change in relation to the spacing S1 between the flux concentrator 15 and the test object 2. The remaining elements correspond to those of FIG. 4.

Figure 7:
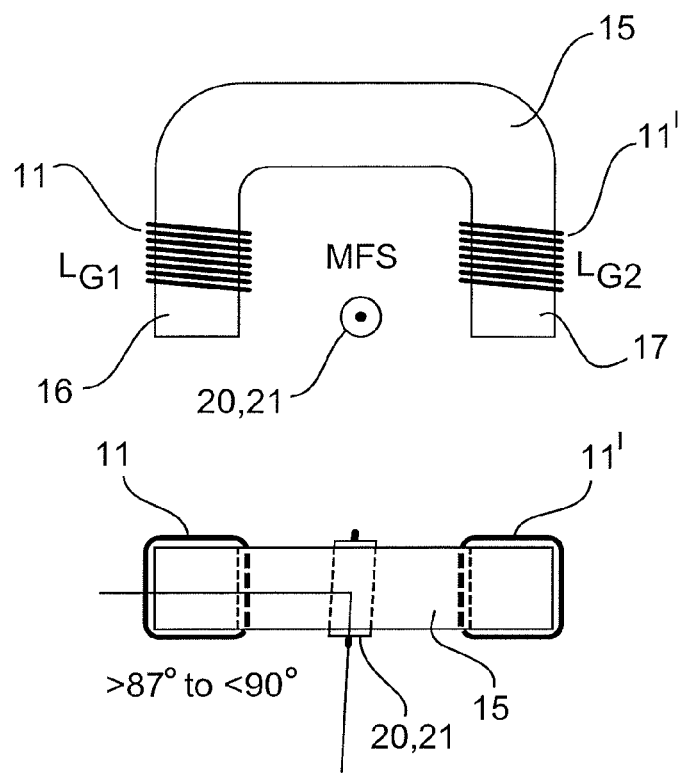
FIG. 7 illustrates a sensor arrangement with an inclined magnetic field sensor according to an exemplary embodiment.

FIG. 7 illustrates an optimized coil orientation of the magnetic field sensing coil 21. For particular applications, the best torque measurements can be performed when the MFS device 20, 21 is slightly angled by e.g. 1 degree, preferably not more than 3 degree in relation to a perpendicular axes (see FIG. 7). However, it is not a simple task to ensure that the MFS device is placed accurately in relation to the flux concentrator axes. The "V" shaped dual MFS coil layout provides also good results, the two coils being connected in differential mode. Such a MFS coil arrangement 21, 21' is much easier to assemble with the required precision and will allow a much greater tolerance when placing this "V" shape in relation to the field generator coil.

In most industry applications and laboratory R&D applications, strain-gage sensors are used to measure bending forces. There are only a few other alternative sensor solutions available that may provide adequate bending sensor performance and are suitable for the environmental conditions where this sensor should be used. However, in general these solutions are too expensive for high volume application, as typical for the automotive, industrial, and consumer market. There are no economical bending sensor solutions available for applications where the test object like a transmission axle is rotating when in use. Nevertheless, it is required to provide a low-cost and non-contact measurement technology. The following description is about a magnetic principle mechanical force sensor design that can detect and quantify mechanical forces from ferro magnetic metallic objects, like a transmission shaft, screw driver shaft, torque wrenches, and power-tool drilling shaft, for example. As unique features of this "active" sensor solution may be considered:

True non-contact sensing principle

Working on magnetic principles

Insensitive to magnetic fields that are already present/stored in the test object Test object does not need to be treated in whatever way (the "active" bending sensor module will be held at the test object and functions immediately without any further preparations)

The sensor performance cannot degrade over time as it is an active sensing principle Insensitive to torque forces (it is measuring in differential mode !)

Sensitive to a single axis bending force only (no cross talk between X and Y bending forces)

Works on test objects that are static or that rotate at any speed

Insensitive to light, dust, mechanical shocks of any kind!, water, humidity, oil, etc.

Works with any test object metallic material as long as it attracts a magnet

Can tolerate when the air-gap/spacing between the test object and the sensor module is changing.

No upper limitation to the test object dimension (shaft diameter, for example).

Can operate from −50 deg C. to above +210 deg C.

This sensor does not need to be physically attached to the test object. There can be a gap of a few millimeters (between the sensor and the test object) and it still will work properly. Therefore this sensor works whatever the test object surface may be (coated, painted, dusty, . . . ), which is ideal for measuring on construction sites, bridges, cranes, building frame works. This sensor works with any metallic material as long as the magnetic properties of the material are sufficient to attract/hold a permanent magnet. Absolutely no changes are needed on the test object. No processing of any kind will be applied to the test object.

The sensor may comprise of two main modules: As actual sensing element built by using passive electronic components, and sensor electronics. Both modules can be placed together in the same housing, but can also be placed separately from each other, only connected to each other by a number of wires. There may be a natural limit about how long the cables can be, e.g. in the area of two meters or more.

Figure 8:
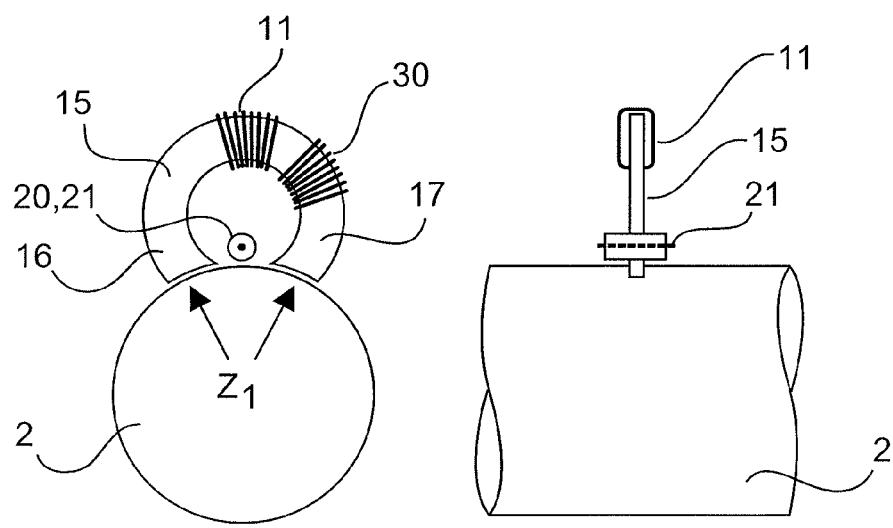
FIG. 8 illustrates a sensor arrangement with a compensation coil with an object to be sensed according to an exemplary embodiment.

FIG. 8 illustrates an exemplary embodiment thereof. This is one of several possible sensor element designs. The main components are included in this drawing. These are a magnetic flux concentrator 15, a magnetic field generator coil (inductor) 11, or a primary coil, a magnetic sensing element 20, which may be any type of magnetic field sensing device, e.g. a coil 21, a hall effect sensor, MR, GMR, etc., and an optional signal feedback coil (inductor) 30, or secondary coil. The flux concentrator may be of a circular section shape or any other shape. The poles 16, 17 of the flux concentrator may face the object 2 and may form a constant gap.

Figure 9:
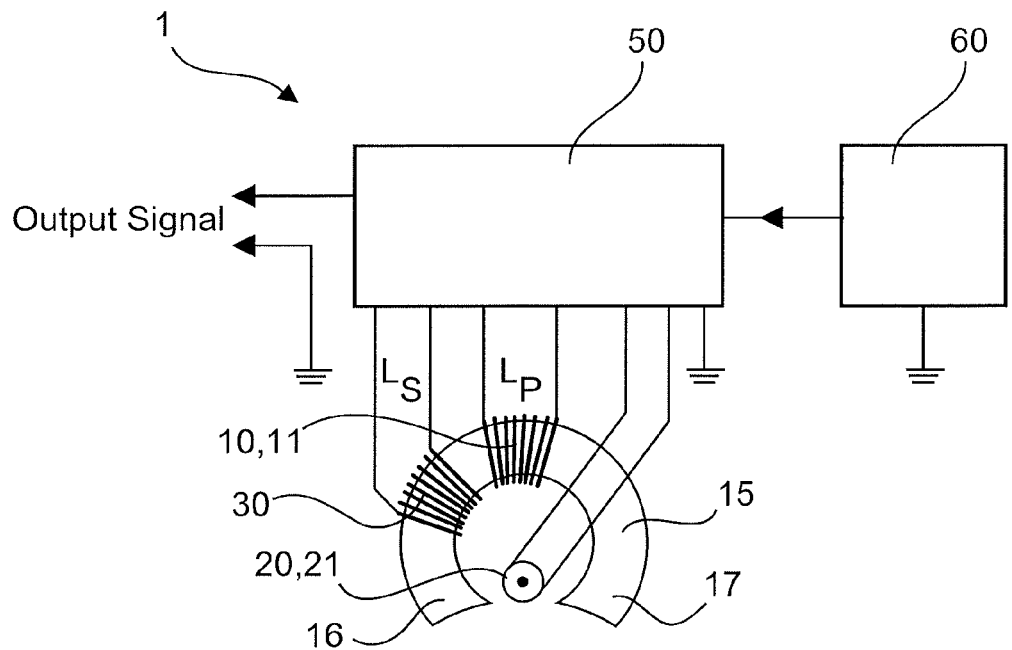
FIG. 9 illustrates a sensor arrangement with a compensation coil and an evaluation unit according to an exemplary embodiment.

FIG. 9 illustrates a sensing unit 1 including a circuit 50 and a flux concentrator 15 and coils 11, 30. A complete and single sensing element may comprise of all the components shown above. The feedback coil 30 ($L_S$ for Secondary Inductor) is optional and is required only when any potential spacing changes between the test object and the sensor module has to be compensated automatically. FIG. 9 also illustrates a power supply 60. The function of the feedback coil 30 can be used when driving the field generator coil with an AC driver signal. The optional feedback coil 30 ($L_S$) is used to detect and measure the spacing (or the gap) between the sensing element and test object surface. The signal measured with this coil will be used to compensate for the unwanted signal amplitude modulation caused when the spacing between the test object and the sensing element keeps changing. In applications where the spacing is not changing, the feedback coil is not required.

Figure 10:
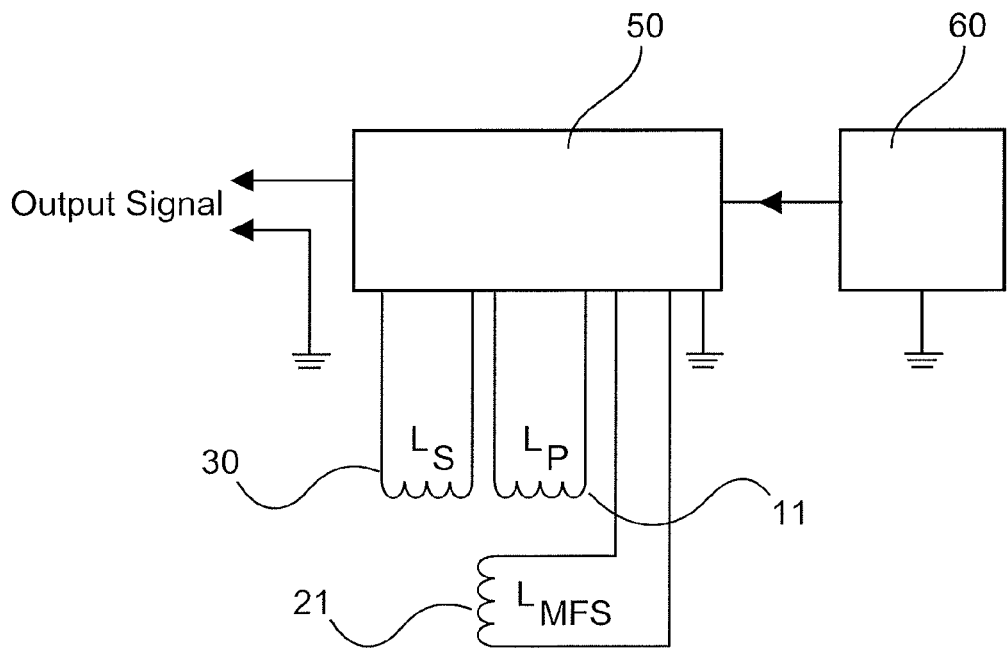
FIG. 10 illustrates a schematic overview of a sensor arrangement with a compensation coil and an evaluation unit according to an exemplary embodiment.

FIG. 10 illustrates a schematic overview on a circuit including a sensor module. The field generator coil 11 (LP for Primary Inductor) and the feedback coil 30 (LS for Secondary Inductor) are placed on the same flux concentrator 15. Signals generated by the field generator coil 11 can be detected and measured by the feedback coil 30. The signal transfer function is influenced by the distance between the flux concentrator to the test object surface. The smaller the air-gaps are between the two poles of the flux concentrator ends 16, 17 and the test object surface, the more efficient is the magnetic transfer between the primary and secondary coils. This relationship is not strictly proportional and has to be linearized by the sensor electronics 52.

Figure 11:
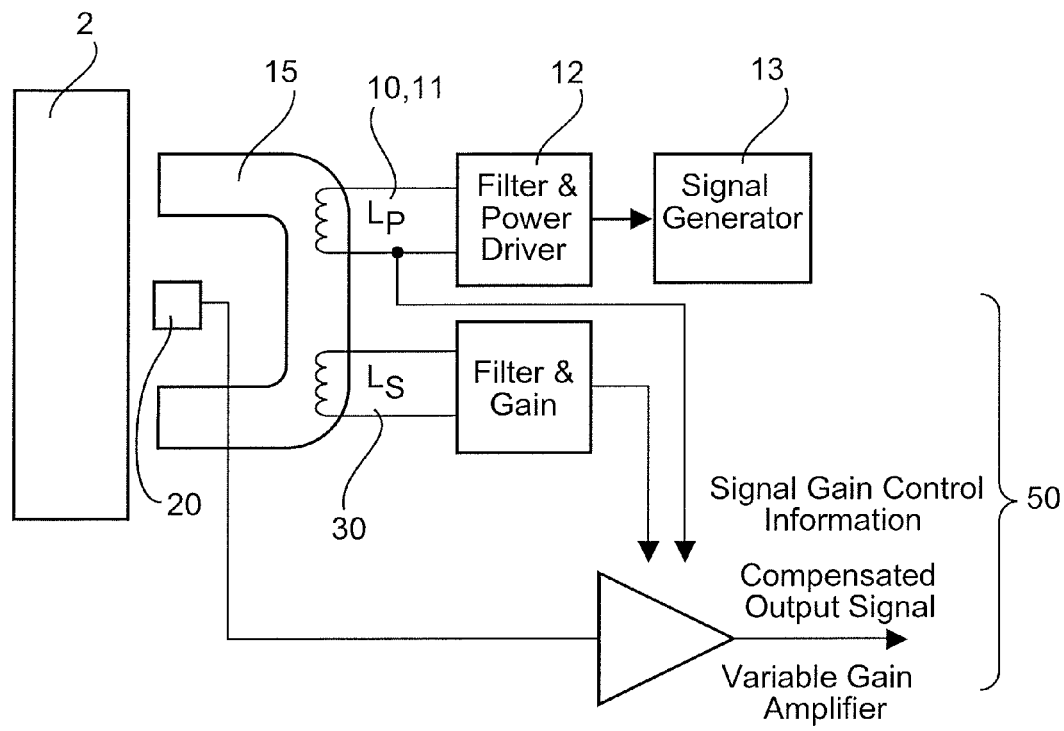
FIG. 11 illustrates a schematic overview of a sensor arrangement with a more detailed evaluation unit according to an exemplary embodiment.

FIG. 11 illustrates a circuit diagram of an exemplary embodiment. A change in the spacing between the flux concentrator 15 and the test object 2 will cause an amplitude change of the signal measured by the feedback coil $L_S$ 30. The signal amplitude information from the field generator coil LP 11 and the feedback coil LS 30 will allow a variable gain amplifier to correct the otherwise changing bending signal amplitude. Important: It may be necessary to linearize the feedback coil signal first before passing it on to the variable gain amplifier.

Figure 12:
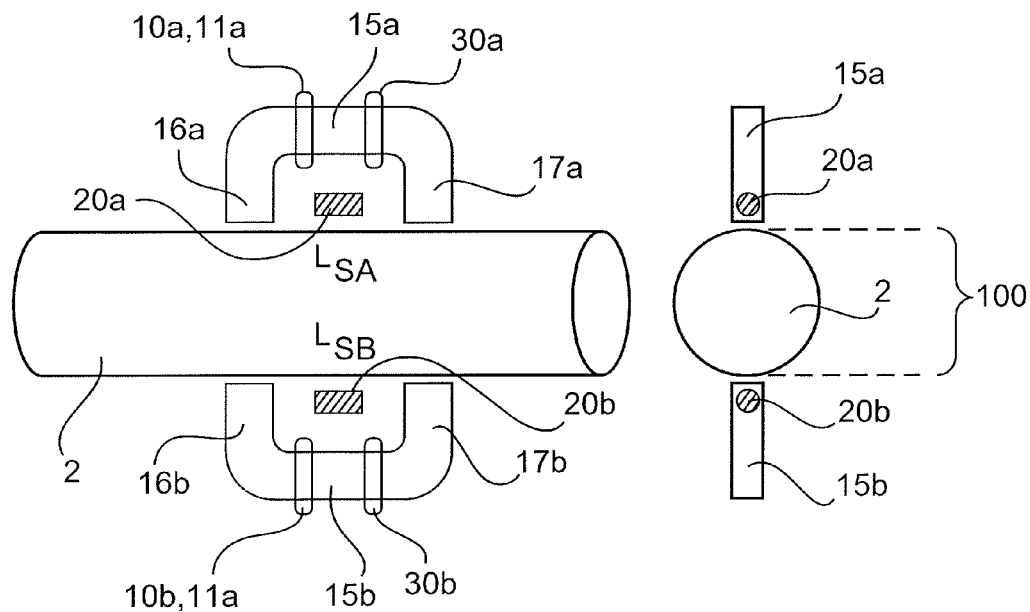
FIG. 12 illustrates a double longitudinal sensor arrangement with an object to be sensed according to an exemplary embodiment.
Figure 14:
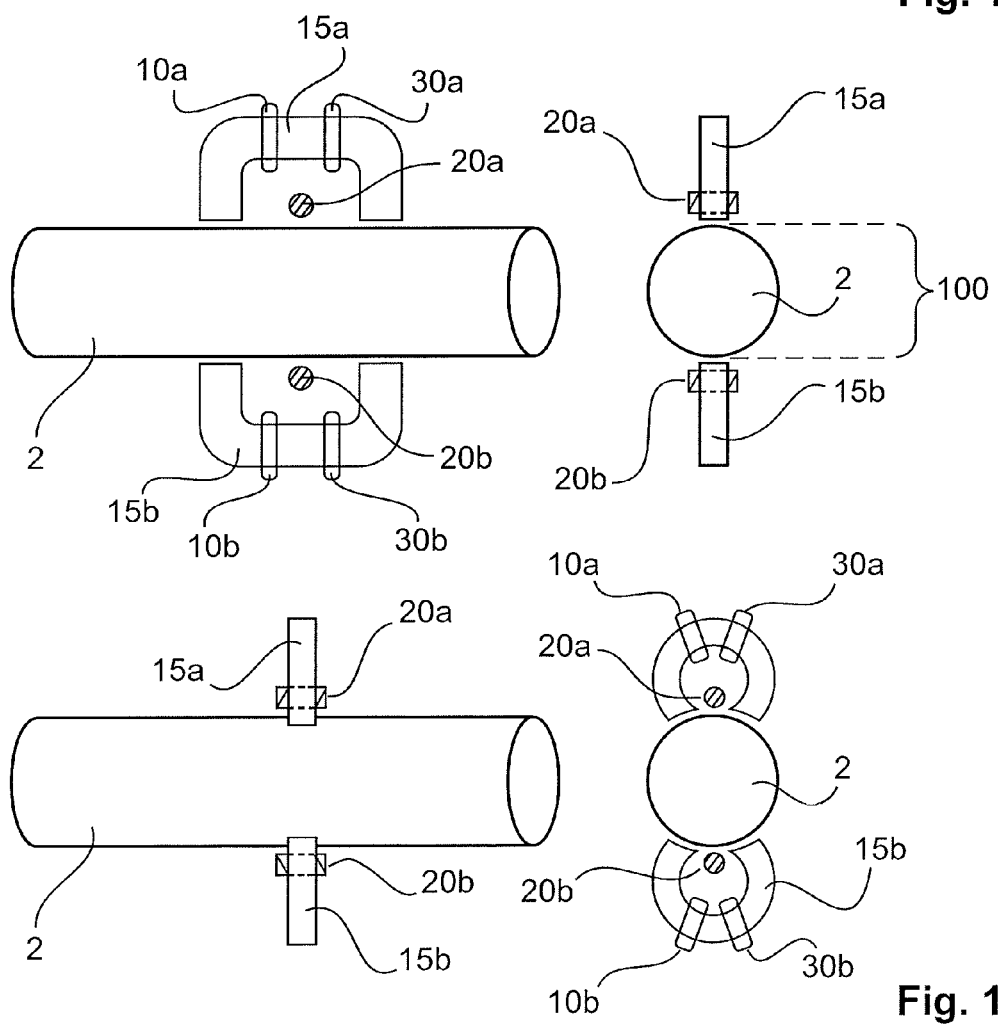
FIG. 14 illustrates two versions of a double sensor arrangement with an object to be sensed according to an exemplary embodiment.

In order to differentiate between the targeted bending force and other mechanical forces, like torque forces, two identical looking sensing elements are placed symmetrically at either side of the test object, as illustrated in FIGS. 12 and 14. By subtracting the measured signals from each other, the potentially present torque forces will be cancelled, and what remains are the targeted bending forces. The mathematical processing of the two signal, one from each individual sensing element, can be done in different ways. One possibility is to connect the magnetic field sensing coils 21, 21' to each other in reversed order, so that they are connected in series in such way that the measured signals are subtracted from each other without any use of active electronics. Another possibility is feeding the individual and conditioned measurement signals to an analogue working summing circuit in order to subtract the signals from each other. A further possibility is using a digital processing system like a microprocessor to execute the mathematical signal processing. This is the most flexible solution. It should be noted that when choosing the first proposed solution (connecting the passive magnetic field sensing coils in series) then great care has to be taken that the signal amplitudes and signal offsets from each sensing coil are well matched. Otherwise the resulting signal may include cross-talk and will be distorted in relation to the targeted output signal.

Two fundamental different sensor module designs provide good measurement results, here called design I and design II. FIG. 12 illustrates design I. When using commercially available inductors with core material, not air-coils, then a good sensor performance can be achieved when aligning the inductor of the sensing coil parallel to the magnetic flux lines that are generated by the generator coil LG 101, 10*b* and then passed through the surface of the test object by the flux concentrator 15*a*, 15*b*. The design shown above with respect to FIG. 12 is also applicable to the design II, as shown in FIG. 14 bottom.

Figure 13:
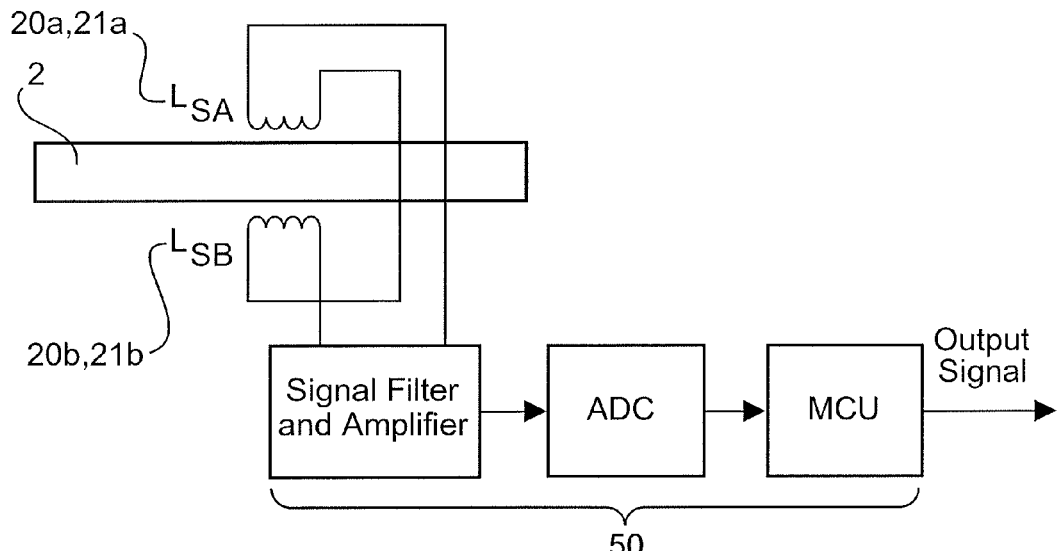
FIG. 13 illustrates a schematic overview of the double sensing arrangement according to an exemplary embodiment.

FIG. 13 illustrates a circuit diagram of the design I and II. As long as the used sensing coils (LSA and LSB) 21*a*, 21*b* are of identical specifications (inductivity, physical dimensions), then the coils can be connected to each other in series with each other, but one has to be connected in reverse order. This allows that the signal measured in LSA and LSB will be subtracted from each other (differential mode sensing) before the signal will be fed into the signal conditioning and signal processing module.

FIG. 14 illustrates two of the possible sensor element orientation in relation to the test object. The magnetic field sensing device 20*a*, 20*b* can be either an inductor with core, a hall effect sensor, a MR, a GMR, or any other magnetic field detecting or sensing device that is suitable for the desired measurement range. The orientation of the magnetic field sensing device in relation to the magnetic flux lines between the two poles 16*a*, 16*b*; 17*a*, 17*b* of the flux concentrator 15*a*, 15*b* may be critical.

Of course it is possible to use a single sensing cell to measure the desired mechanical forces. Using a single sensing cell only will reduce further the cost and makes the senor much smaller. However, by doing so it will not be possible to differentiate between the applied bending forces and the potentially available other mechanical forces, like torque or bending in another axis. Meaning, when using a single sensing cell structure, the sensor module wills pick-up several different mechanical forces at the same time without any possibility to differentiate between them. The only way a single cell active bending sensor can be used safely is when the test object has been built and mounted in its application in such way, that only the desired mechanical forces travel through it. Meaning that there will be no interfering mechanical forces present, like torque forces.

Figure 15:
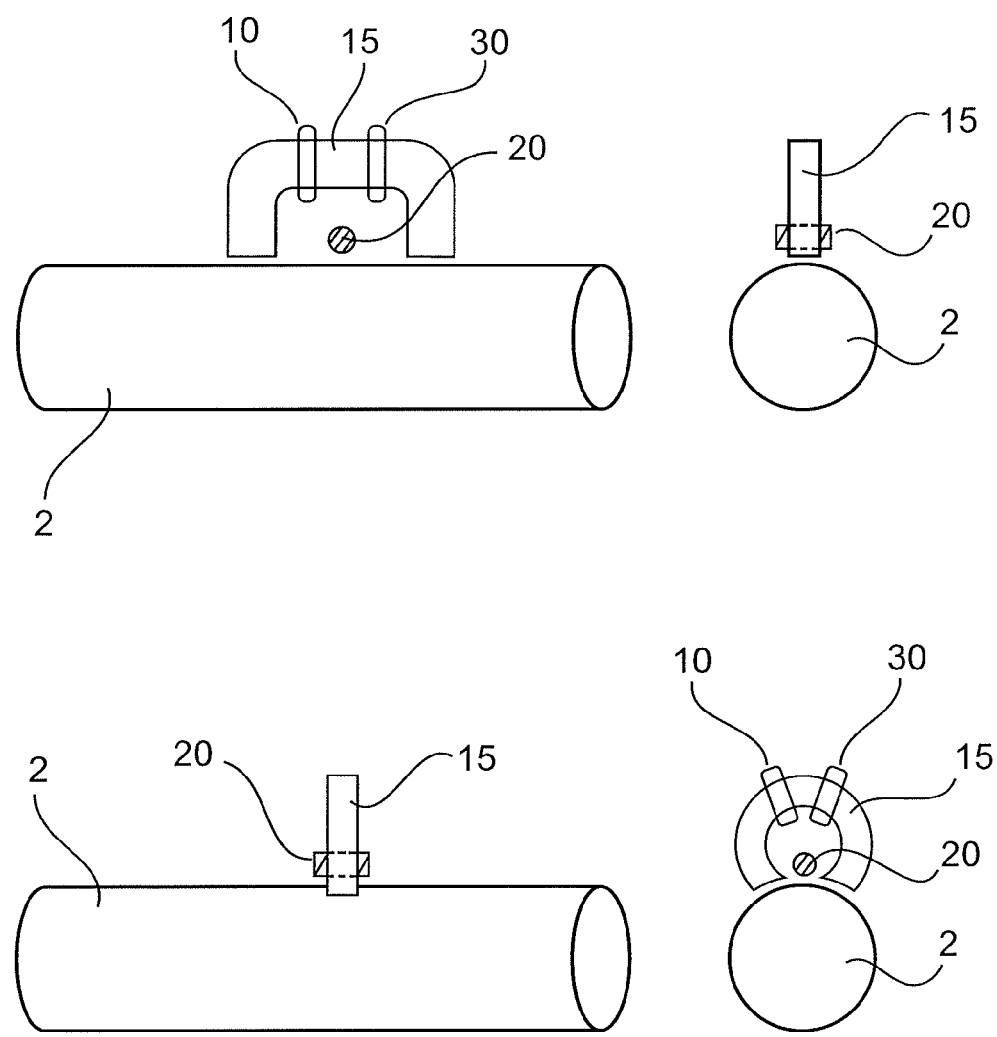
FIG. 15 illustrates two versions of a single sensor arrangement with an object to be sensed according to an exemplary embodiment.

FIG. 15 illustrates a "half" design I and II. Using only a single sensor element is only advisable when there are no mechanical forces applied to the test object, other than the targeted bending forces. Otherwise the output signal of the active bending sensing element may by the summary or a mix of the targeted and the interfering mechanical forces.

Initially it was assumed that the test object material has to be of similar quality and performances in relation to magnetic properties as required when building magnetostriction principle based bending sensors. Those ferromagnetic materials are slightly more costly than "normal" steels as they have to include Nickel, Chrome, or similar material, in single form or in some combinations. The test results (when designing and building an active bending sensor) have shown that a much wider range of metal materials can be used than anticipated. As long as a permanent magnet will stuck to a test object then the active bending sensor will function. In order to achieve the best possible measurement signal quality, it is advisable to harden the test object material, at least at the sensing region. As the sensing region may be seen the location where the active bending sensor will be placed. Failing to do so will result in a relative large measurement hysteresis.

When using test object materials that have ferromagnetic properties and can be permanently magnetised then this material should not be used in a DC driven active bending sensor. The reason is that this material will slowly but steadily become a bar magnet where the active bending sensor is placed (meaning that the location where the active bending sensor is placed will act like a magnet by itself after some time. "Some time" means: within a few seconds or a few minutes). When this happens the signal offset of the bending sensor output will drift in one direction and will not be stable. In reverse it is therefore very logical that a DC operated active bending sensor is very sensitive to magnetic fields that are stored beneath the surface of the test object. Before usage, the material of the test object has to be degaussed first.

When running the active bending sensor in AC mode (the field generator coil is driven by a symmetrically alternating current and a certain frequency), and when using standard inductors with ferromagnetic core, then the active bending sensor design is in most cases insensitive to magnetic fields stored in the test object. "Most Cases" means that there are possible cases where the AC driven active bending sensor will be sensitive to magnetic fields that are stored beneath the test object surface. Example: Assuming there is one magnetic spot stored in the test object (at the sensing region), and further assuming that there are two sensing coils placed symmetrically around the shaft, then, at a shaft rotational speed of 300 revolution per second (equivalent to 18.000 rpm) the signal generated by this magnetic spot will interfere with the sensor system internal signal decoding function.

The orientation of the sensing coil (in relation to the magnetic flux lines, generated by the generator coil and the flux concentrator) decides about what mechanical force will be detected and measured, and how large the measured signal will be (signal quality).

Traditional bending sensing technologies required that the sensing element is firmly attached to the test object surface to assure that the mechanical forces of interest travel through it for measurement. The cable connections required (from and to the sensor element), the environmental limitations (humidity and thermal cycles will limit the life time of the sensing element), and the costs associated with these sensing technologies limits their usage and is prohibitive in volume applications. The active bending sensor overcomes all of these issues and can therefore being used widely in the markets: automotive, avionics, industry, consumer, and instrumentation, like:

- Diagnostics and preventive care on large building structures (bridges, skyscrapers)
- Real-time measurements in car/truck suspensions for active suspension or active stability control.
- Avionics: Wing loads at bad weather situations; diagnostics on the frame structure
- Consumer and professional tools: building torque wrenches (through bending forces); and tool overload detection.
- Wind power: Turbine structure and propeller structure when exposed to gail forces.
- Industrial processing equipment like paper mills, steel production, and tooling equipment (detecting force limits to prevent damages for tools and materials.

A generator coil is driven by either a DC or a specific AC signal, and with this produces magnetic flux beneath the surface of the test object. The mechanical forces that travel through the test object will influence the direction the magnetic flux lines will take when trying to go from one-to-the-other poles of the flux concentrator. The change in the travel-direction of the magnetic flux lines can be detected by a magnetic field sensing device that is placed on the surface of the test object. The signal changes picked-up by the magnetic field sensing device are proportional to the targeted mechanical forces that are applied to the test object. When using a electric DC current to drive the field generator coil, then there is the risk of beginning to permanently magnetise a small section of the test object (material dependant). This will cause a signal offset that may look like a real signal caused by mechanical forces. This problem can be circumvented by using an electric AC driver signal to run the field generator. However, only very specific frequencies are suitable to detect and measure mechanical forces from the test object.

Figure 16:
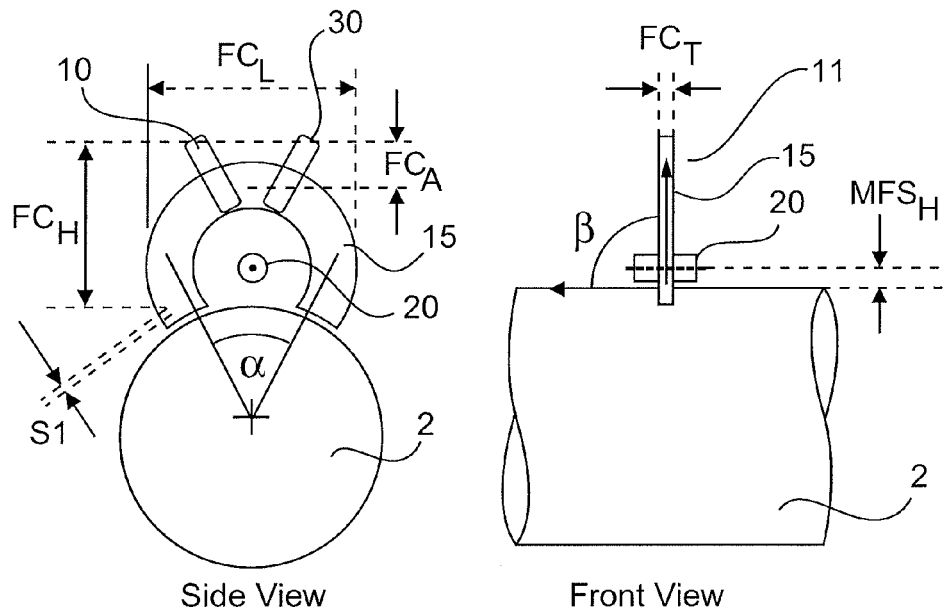
FIG. 16 illustrates size definitions of a sensor arrangement according to an exemplary embodiment.
Figure 16:
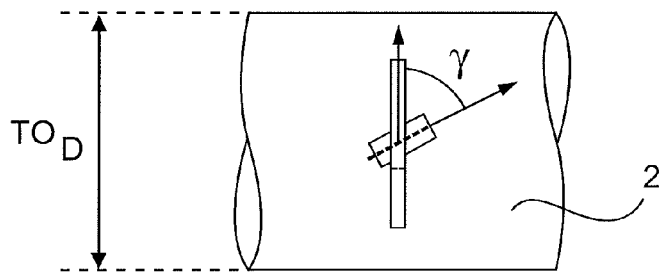

FIG. 16 illustrates the physical dimensions of the sensing device. The $angle_{MFS}$ α decides about what mechanical force and what the quality of the measured signal will be. This angle also decides about potential "cross-talk" in the measured signal will be caused by the different mechanical forces that may applied to the test object.

One of the major differences between a passive and an active magnetic principle mechanical force sensor is that there will be no need for a "permanent" magnetisation of the test object to make the sensor work. An active mechanical force (bending) sensor can function immediately after placing the sensor hardware appropriately, nearest to the test object. The following task list description is focusing on one or two of the "most-likely", active-mechanical-force (bending), sensor designs that indicates to achieve the desired sensor performances. The two physical sensor hardware designs that have provided best results, so far, are here called design I and design II. Early results indicate that design II provides slightly better results than design I. However, design I is a bit easier to manufacture.

The Active Sensor System may comprise several modules. These modules are the sensor hardware (like the flux concentrator 15, the generator coil 11, 11', the feedback coil 30, and the MFS Coil 21), the electronic circuit 50, an e.g. 6-lead connection cable between the sensor hardware and the electronics, an electric power supply 60, and an e.g. 2-lead connection cable between the electronics and the power supply, as can be seen from FIG. 9.

Figure 17:
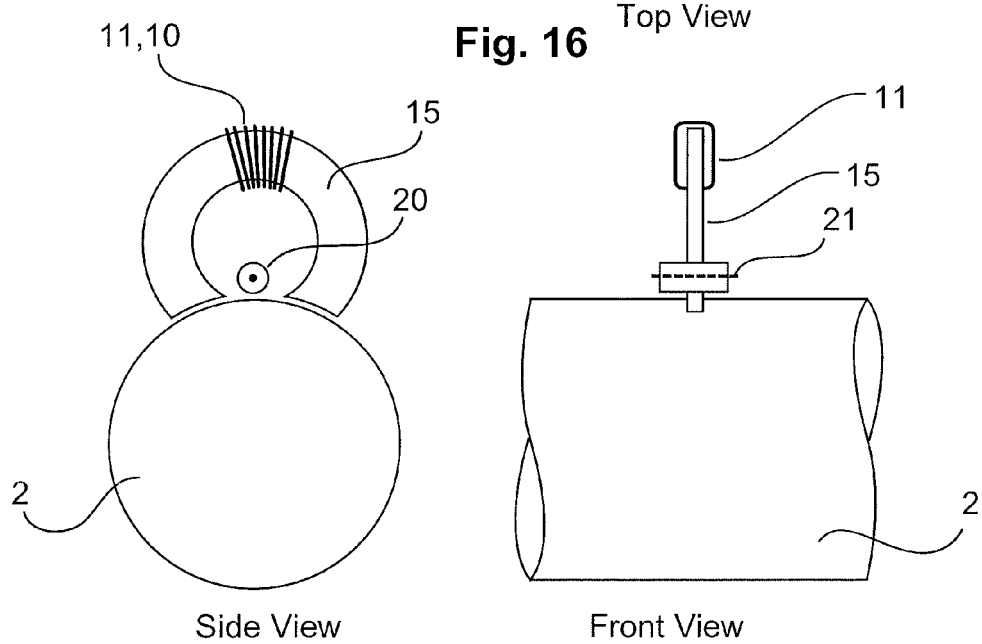
FIG. 17 illustrates a side and front view of an sensor arrangement according to an exemplary embodiment.

FIG. 17 illustrates a front and side view of an sensor module and a test object 2.

As this is a totally new sensing technology it is difficult to define what the target specifications have to be. Basically the target specifications will be defined by the application the sensor should be used in. However, based on the market knowledge we have gained over the last 10 years we can make an assumption about what the "minimum" specifications have to be so that the active bending sensor will find some usage in the market. Equally we can define what an "average" specification would be, here called "standard", and what an "excellent" performance of an active sending sensor would be.

| Specification | Explanation | Mininmum Typical | Standard Typical | Excellent Typical | Uniit |
|---|---|---|---|---|---|
| Smallest usable shaft diameter | | 20 | 12 | 10 | mm |
| Largest usable shaft diameter | | 50 | 100 | unlimited | mm |
| Signal Resolution | Equivalent in digital Bits | 8 | 10 | 12 | Bit |
| Repeatability | As a ppercentage of Full Scale | +/−1 | +/−0.5 | +/−0.1 | % of FS |
| Signal Bandwidth | analogue Hz | 100 | 1,000 | 10,000 | Hz |
| Signal Hysteresis | when using Ferro-Magnetic material | +/−2 | +/−0.5 | +/−0.2 | % of FS |

| Specification | Explanation | Mininmum Typical | Standard Typical | Excellent Typical | Uniit |
|---|---|---|---|---|---|
| Output Signal Range | Max negative to max positive Torque | 1.5 | 2 | 4 | V |
| Signal-to-Noise | | 10 | 5 | <2.5 | mV |
| Air Gap Variation | Sensor to Shaft Surface Variation | none | 1.5 | 4 | mm |
| Sensor Hardware Height | Radial Spacing Required for 25 mm shaft | 25 | 20 | <15 | mm |
| Electric Current Consumption | | <250 | <125 | <75 | mA |
| Operating Temperature Range | Sensor Hardware only | 0 to +70 | −20 to +85 | 40 to +150 | deg C. |

To support the technical communication when reporting and documenting the dimensions of an active bending sensor hardware, the dimensional parameters have been specified, as shown in FIG. 16.

FIG. 16 illustrates specifications being example specifications only of one specific active sensor model. These specifications have to be optimized and their affects in relation to the sensor performance better understood.

| Specification | Symbols | Explanations | Min | Typ. | Max | Unit |
|---|---|---|---|---|---|---|
| Flux Concentrator Length | FCL | | | 22 | | mm |
| Flux Concentrator Height | FCH | | | 20 | | mm |
| Flux Concentrator Thickness | FCT | | | 4 | | mm |
| Flux Concentrator Channel Thickness | FCA | | | 2.5 | | mm |
| Flux Concentrator Tilting | Angle T | | −1 | | +1 | degree |
| Flux Concentrator Pole Opening Angle | Angle FC | | | 60 | | degree |
| Angle MFS axis to Generator Field Axis | Angle MFS | | | 88 | | degree |
| Flux Concentrator Material | | | | Washer Steel | | |
| Number of Metal Elements used in FC | | | 1 | 3 | | |
| Spacing: FC Poles and Test Object | Space | | 0.1 | | 1.1 | mm |
| Distance Centre MFS Coil to Test Object | MFS H | | | 2 | | mm |
| Test Object Diameter | TO D | | | 15 | | mm |
| Generator Coil Number of Turns | | | | 100 | | Windings |
| Coil wire thickness | | | | 0.28 | | mm |
| Axial Coil Length on FC | | | | 10 | | mm |
| Location in respect of the FC | | | | Centre | | |
| MFS Coil Specification: Turns | | | | 400 | | Windings |
| MFS Coil Wire Thickness | | | | 80 | | um |
| Coil Body length | | | | 6 | | mm |
| MFS Coil Body Diameter | | | | 2 | | mm |
| MFS Coil Resistivity | | DC Current | | 10 | | Ohm |
| MFS Coil Manufacturer | | | | KUK | | |

Figure 18:
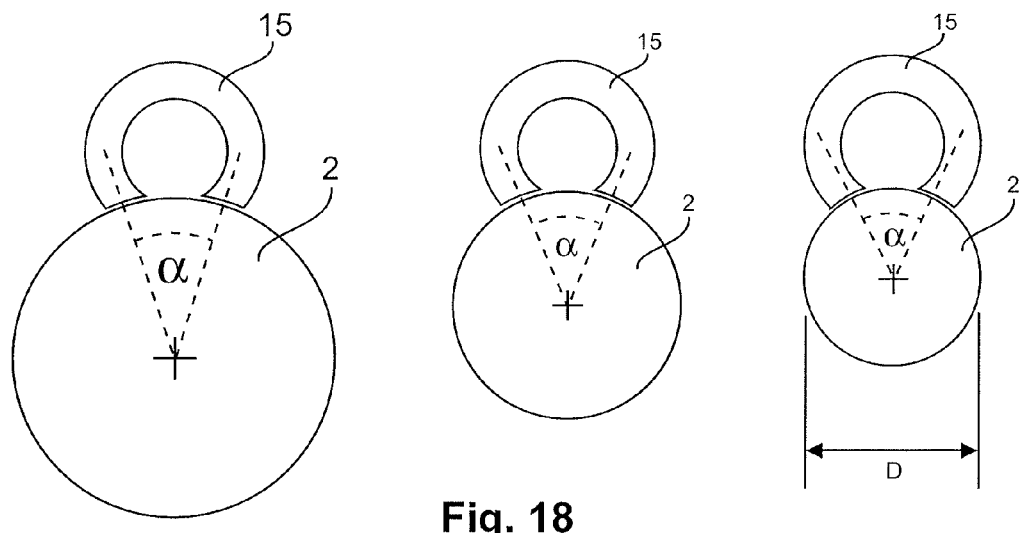
FIG. 18 illustrates a variety of relative dimensions of an object to be sensed and a flux concentrator according to an exemplary embodiment.

The diameter of the test object or drive shaft defines among a few other parameters the bending forces related signal gain. The larger the diameter of the shaft will be, the smaller the signal gain will become in relation to a constant bending force that will be applied to the shaft. The active bending sensor signal gain is defined by a number of specific specifications. When trying to reconfirm the sensors behavior when the test object diameter or cross section area will be changed, then all of the other sensor parameters have to be kept constant, like:
Identical shaft material
Identical hardening and annealing process
Spacing/gap between the test object and the sensor hardware
Magnetic flux density generated by the sensor hardware
Inductivity and driver circuit
Sensor hardware dimensions
The surface area of the two magnetic poles
Adapted: The radius cut into the poles to match the shaft diameter FIG. 18 illustrates several diameters of the object 2. One and the same sensor hardware design is used to perform this test. However, the two magnet-pole surfaces, facing the test object have to be prepared specially for each shaft diameter.

Important is that the "gap" (spacing) between the magnet-poles are kept constant to leave the same "room" for the MFS coil. Most likely the bending sensor signal gain is also defined by the arch specification of the sensor hardware. Arch specification means here: "The angle with which the sensor hardware is covering the test object". The angle of the sensor arch is different in all of the three examples shown above. There are two conflicting assumptions which may exist both and to some extend compensate for each other. The larger the arch angle the larger the signal gain will be. With a larger arch angle a larger area of the sensor surface will be covered and will make it easier to detect the under torque forces twisting magnetic signal. The nearer the two magnetic poles will come to the opposing shaft sides, the smaller the sensor signal will become. In this case (when the poles are placed to opposing shaft sides) the magnetic field will now travel almost 100% directly through the shaft material and will not show any effects on the shaft surface (where the sensing coil is placed).

Figure 19:
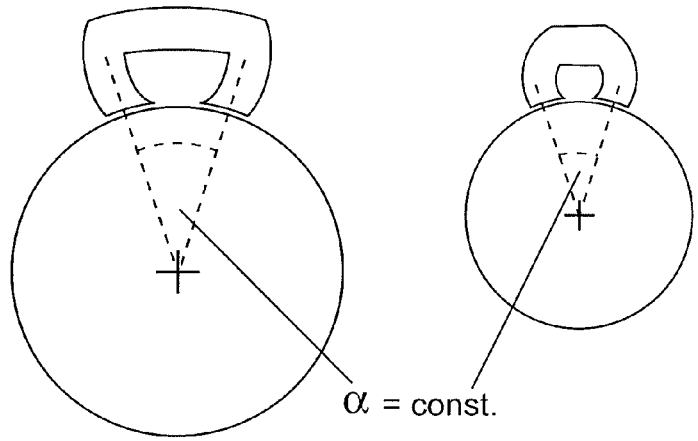
FIG. 19 illustrates variations having a constant angle between the poles according to an exemplary embodiment.

FIG. 19 illustrates different flux concentrator shapes. In FIG. 19 the shaft diameter is changing and the angle of the arch (sensor hardware) has been kept constant. This means that the sensor hardware design will change substantially for each shaft diameter.

There are several design options that have been tested, to automatically compensate for the signal gain changes when the spacing between the sensor and the shaft surface is changing. The most straight-forward design solution is to use a feedback coil.

The feedback coil as described with respect to FIG. 9 provides precise information about the sensor efficiency or when the spacing between the sensor hardware and the shaft surface is changing.

Till to-date, all of the tests that have been performed on active bending sensors used "standard" washers and clip-rings as the flux concentrator. The term "standard" means that a wide range of available washers have been bought through professional channels (Hoffman Tools) and through consumer shops (Obi in Germany) and have been used for the sensor design. The only decision criteria applied to decide about "which washer or clip-ring material can be used" is that the material shows a strong response to a permanent magnet held near it. So far no tests have been planned or executed to determine what sensor performance differences can be achieved when using higher grade materials, like transformer steel, for example.

The reasons for not focusing on "optimizing" the flux concentrator material have been the sensor performance are greatly influenced by other factors, we are working on first, the washer and clip rings have a perfect design that simplified the initial sensor design and saved time (Washers are perfectly symmetrically shaped and are available in almost all desired sizes and thickness), and very low cost and widely available.

At least five different washers and clip-ring types have been used so far which differed in material type (hardened spring steel, non-hardened washers, for example), coating (None, Chrome, Zink . . . ). They all performed well. To determine which material does perform best and "what are the performance differences", it will be necessary to either buy or to tool "identical" sized and "identical" shaped flux concentrators, so that the test results can be compared with each other.

Obviously, the choice of flux gate material will influence the sensor performance. As the active bending sensor can be run in a DC mode or in a AC mode, there are different material specification requirements for each of these two operation modes as well. When the chosen material has a high remanence then it is not suitable for DC operation as the flux concentrator shows different reaction before and after it has been permanently magnetized. It can be assumed that transformer steel will be a good material choice. It is also widely available, but costly.

Initially it was assumed that the test object material has to be of similar quality and performances (in relation to magnetic properties) as required when building magnetostriction bending sensors. Those ferromagnetic materials are slightly more costly than "normal" steels as they have to include Nickel, Chrome, or similar material, in single form or in some combinations. Astonishingly, test results have shown that a much wider range of metallic materials can be used than anticipated.

When using test object material that has ferromagnetic properties and can be permanently magnetised then this material should not be used in a DC driven active bending sensor. The reason is that this material will slowly but steadily become a bar magnet where the active bending sensor is placed (meaning that the location where the active bending sensor is placed will act like a magnet by itself after some time. "Some time" means: within a few seconds or a few minutes). When this happens the signal offset of the bending sensor output will drift in one direction and will not be stable. In reverse it is therefore very logical that a DC operated active bending sensor is very sensitive to magnetic fields that are stored beneath the surface of the test object. Before usage, the material of the test object has to be degaussed first.

When running the active bending sensor in AC mode (the field generator coil is driven by a symmetrically alternating current and a certain frequency), and when using standard inductors with ferromagnetic core, then the active bending sensor design is in most cases insensitive to magnetic fields stored In the test object. "Most Cases" means that there are possible cases where the AC driven active bending sensor will be sensitive to magnetic fields that are stored beneath the test object Surface.

Figure 21:
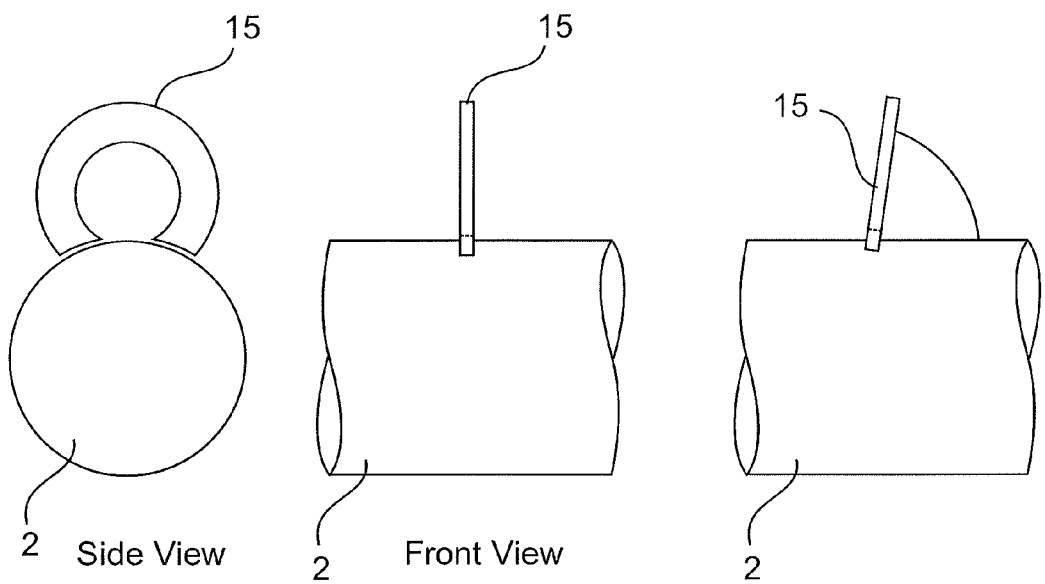
FIG. 21 illustrates variations of the inclination of a flux concentrator according to an exemplary embodiment.

FIG. 21 illustrates flux concentrators 2 having a different inclination with respect to the object to be sensed. Most likely any tilting of the Flux Concentrator will reduce the signal gain.

The thickness of the flux concentrator device defines the precision a specific mechanical force can be selectively identified and measured. It is important that the magnetic flux lines generated will be channeled through the surface of the test object to assure sufficient signal amplitude, generated by the magnetic field sensing device. When making the flux concentrator to thin then the field generated by the field generator coil will create unwanted magnetic stray fields.

Figure 22:
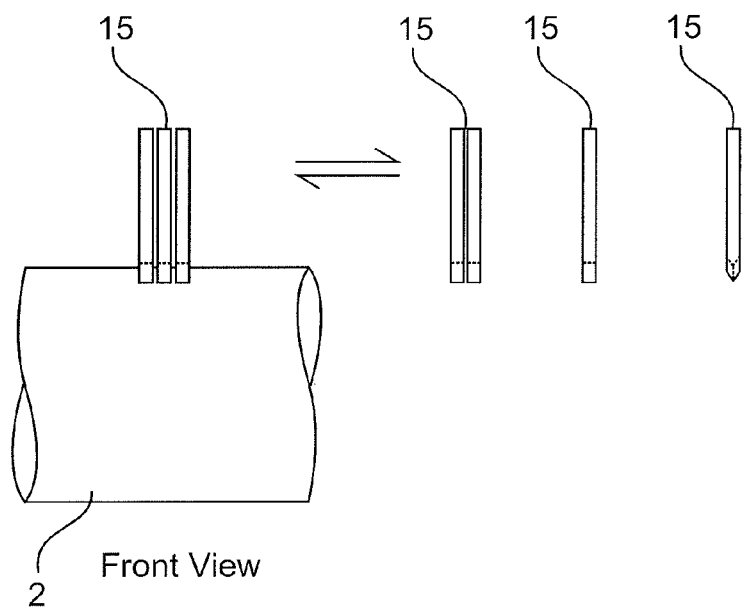
FIG. 22 illustrates variations of a flux concentrator according to an exemplary embodiment.

FIG. 22 illustrates different shapes and dimensions of a flux concentrator. It needs to be tested and evaluated about how the sensor performance will change when reducing the flux concentrator thickness, or even the shape of the front part (the two poles). To get the pole surface very slim, the pole end can be "sharpened". The potential benefit is that such a design will be less sensitive to the tilting of the flux concentrator.

Figure 20:
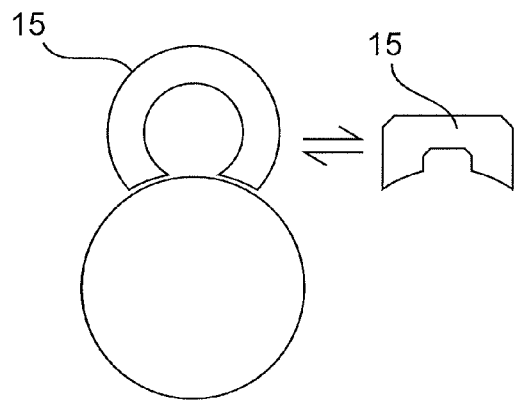
FIG. 20 illustrates variations of the flux concentrator shape according to an exemplary embodiment.

FIG. 20 illustrates different flux concentrator profiles. A "low profile" mechanical design is preferred in most applications. However, great care has to be taken that there are no sharp "corners" left at the flux concentrator as the magnetic field will escape there and generates unwanted stray fields. It is also important to ensure that the top part of the flux concentrator is not getting too close to the surface of the test object as otherwise that part of the flux concentrator will interfere with the measurement signal (will "steal away" the magnetic signal that should be detected and captured by the MFS device. It is important to reduce the radial space required for the active torque sensor as much as possible in order to fit this sensor into small spaces. However, by reducing the radial dimensions the generator coil will come closer to the sensing coil and closer to the test object surface which may start to interfere with the otherwise achievable sensor performance.

REFERENCE LIST 1 contactless measurement sensor
2 object to be sensed
10, 10a, 10b first/second magnetic field generating unit
11, 11', 11a, 11b magnetic field generating element
12 signal generator
13 driver
15, 15a, 15b flux concentrator
16, 16a, 16b first/second pole
17, 17a, 17b first/second pole
20, 20a, 20b first/second magnetic field detector unit
21, 21', 21a, 21b magnetic field sensing coil
30, 30a, 30b feedback element, distance detection coil
50 evaluating unit
51 buffering, offset, filtering, rectifier
52 linearisation
53 gain factor calculaton
55 signal processing and filtering
56 PGA
60 power supply
100 space
D test object diameter RS shunt resistor
S1 space pole test object to be sensed
(α) alpha angle FC, angle sensor arch
(β) beta angle T
(γ) gamma angle MFS

The invention claimed is:

1. A contactless measurement sensor for measuring at least one of (a) a distance to an object to be sensed, (b) a motion with respect to the object, (c) a speed with respect to the object, (d) a torque applied to the object, and (e) a force applied to the object, the sensor comprising:
   a first magnetic field generating unit generating a magnetic field towards the object;
   a first magnetic field detector unit detecting a first magnetic field which field being generated by the first field generator unit influenced by the at least one of the distance, the motion, the speed, the applied torque and the applied force, wherein the first magnetic field detector unit is further outputting a first signal being representative for the detected magnetic field;
   an evaluating unit evaluating a signal strength of the first signal and determining the at least one of the distance, the motion, the speed, the applied torque and the applied force based on the first signal;
   at least one feedback element connected to the evaluation unit and providing a comparative signal, based on which the evaluation unit compensates a varying distance between the sensor and the object;
   a second magnetic field generating unit generating a magnetic field towards the object; and
   a second magnetic field detector unit detecting a magnetic field which field being generated by the second field generator unit and being influenced by the applied force to be measured,
   wherein the second magnetic field detector unit is further outputting a second signal being representative for the detected magnetic field,
   wherein the evaluating unit is evaluating a signal strength of the first signal and the second signal and determining the applied force based on the first signal and the second signal, and
   wherein the first magnetic field generating unit and the second magnetic field generating unit are arranged at opposite sides of the object so as to be oriented toward each other, having a space between the first magnetic field generation unit and the first magnetic field sensing unit on the one hand and the second magnetic field generation unit and the second magnetic field sensing unit on the other hand for receiving the object with respect to which the at least one of the distance, the motion, the speed, the applied torque and the applied force is to be measured.

2. The sensor according to claim 1, wherein at least one of the first and second magnetic field generating units includes a magnetic field generating element and a flux concentrator and wherein the flux concentrator cooperates with the magnetic field generating element so as to concentrate the generated magnetic field towards the object.

3. The sensor according to claim 2, wherein the flux concentrator has a U-shape having two poles and wherein the poles are oriented towards the object.

4. The sensor according to claim 2, wherein the flux concentrator has a horseshoe shape having two poles and wherein the poles are oriented towards the object.

5. The sensor according to claim 3, wherein at least one of the first and second magnetic field detecting units includes a coil which is located between the poles.

6. The sensor according to claim 5, wherein the coil is oriented into a direction corresponding to a connection line between the poles.

7. The sensor according to claim 5, wherein the coil is oriented traverse to a direction corresponding to a connection line between the poles.

8. The sensor according to claim 6, wherein the coil is offset relative to a connection line between the poles.

9. The sensor according to claim 2, wherein the feedback element is a coil wound around the flux concentrator.

10. The sensor according to claim 1, wherein the evaluation unit is determining a distance between the magnetic field generating unit and the object based on a signal of the feedback element.

11. The sensor according to claim 1, wherein at least one of the first and second magnetic field generating units is generating a magnetic field being a combination of a permanent magnetic field and a magnetic field having an alternating frequency.

12. The sensor according to claim 1, wherein at least one of the first and second magnetic field generating units is adopting a frequency of the generated magnetic field.

13. The sensor according to claim 1, wherein the space is configured to receive an elongated object.

14. The sensor according to claim 1, wherein the sensor is further measuring bending forces and wherein the evaluation unit is evaluating the first and second signals and determining a bending force based on the first and second signals.

15. A contactless measurement sensor for measuring at least one of (a) a distance to an object to be sensed, (b) a motion with respect to the object, (c) a speed with respect to the object, (d) a torque applied to the object, and (e) a force applied to the object, the sensor comprising:
   a first magnetic field generating unit generating a magnetic field towards the object;
   a first magnetic field detector unit detecting a first magnetic field which field being generated by the first field generator unit influenced by the at least one of the distance, the motion, the speed, the applied torque and the applied force to be measured, wherein the first magnetic field detector unit is further outputting a first signal being representative for the detected magnetic field;
   an evaluating unit evaluating a signal strength of the first signal and determining the at least one of the distance, the motion, the speed, the applied torque and the applied force based on the first signal;
   wherein the first magnetic field generating unit includes a coil wound around a flux concentrator, the coil serving as a feedback element and wherein the sensor further comprising:
   a shunt resistor being parallel to the coil,
       wherein the signal for evaluating is the voltage drop over the shunt resistor,
   wherein the sensor further comprising:
   a second magnetic field generating unit generating a magnetic field towards the object; and
   a second magnetic field detector unit detecting a magnetic field which field being generated by the second field generator unit and being influenced by the applied force to be measured,
   wherein the second magnetic field detector unit is further outputting a second signal being representative for the detected magnetic field, wherein the evaluating unit is evaluating a signal strength of the first signal and the second signal and determining the applied force based on the first signal and the second signal, and wherein the first magnetic field generating unit and the second magnetic field generating unit are arranged at opposite sides of the object so as to be oriented toward each other, having a space between the first magnetic field generation unit and the first magnetic field sensing unit on the one hand and the second magnetic field generation unit and the second magnetic field sensing unit on the other hand for receiving the object with respect to which the at least one of the distance, the motion, the speed, the applied torque and the applied force is to be measured.

\* \* \* \* \*